United States Patent [19] [11] 4,164,197
Nelson [45] Aug. 14, 1979

[54] LIQUID LEVEL INDICATING DEVICE

[75] Inventor: Thomas E. Nelson, Anchorage, Ky.

[73] Assignee: General Electric Company, Louisville, Ky.

[21] Appl. No.: 852,137

[22] Filed: Nov. 16, 1977

[51] Int. Cl.² .............................................. G01F 23/02
[52] U.S. Cl. .................................... 116/227; 134/113; 222/156
[58] Field of Search .......................... 222/23, 155–159; 68/17 R; 134/113; 116/109, 118 R, 118 A; 73/323; 137/558

[56] References Cited

U.S. PATENT DOCUMENTS

| 3,152,723 | 10/1964 | Perl et al. | 68/17 R X |
| 3,370,597 | 2/1968 | Fox | 68/17 R X |
| 3,608,514 | 9/1971 | Dunn | 134/113 X |
| 3,980,206 | 9/1976 | Hancock | 222/156 |

FOREIGN PATENT DOCUMENTS 2407544  8/1975  Fed. Rep. of Germany ........... 134/113

Primary Examiner—Robert J. Spar
Assistant Examiner—Fred A. Silverberg
Attorney, Agent, or Firm—Bruce A. Yungman; Radford M. Reams

[57] ABSTRACT

A liquid level indicator for providing a visual indication when the level of liquid contained in a movably mounted tank is at or above a predetermined level, disclosed in conjunction with door-mounted rinse aid dispenser tanks for dishwashers, and includes an indicator knob having a stem portion acting as a closure for the tank filler opening accessible from the inside of the dishwasher door. A viewing chamber having a sight window is located in the end of the indicator knob with a feed reservoir arrangement causing liquid within the tank to flow by gravity into the viewing chamber when the door is closed, and a portion of the liquid being retained there upon opening of the dishwasher door, providing a visual indication that the level within the tank is at or above the predetermined level. Upon decline of the liquid level below the predetermined level, further flow into the viewing chamber no longer occurs and liquid in the viewing chamber is successively decreased by the return to the tank of liquid by successive door openings and closings to indicate the approach of a tank empty condition. Several variations of masking panels are disclosed cooperating with the sight window to provide a full and empty indication in conjunction with the presence and absence of liquid within the viewing chamber.

14 Claims, 19 Drawing Figures

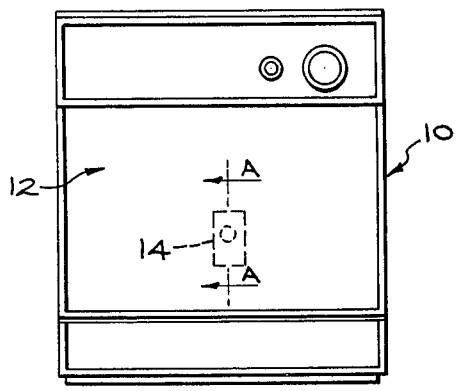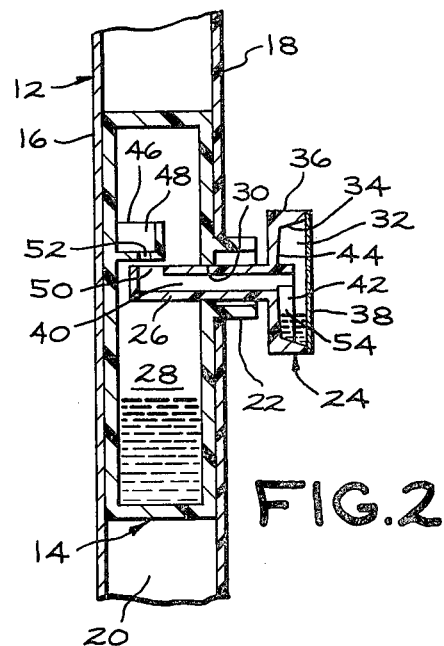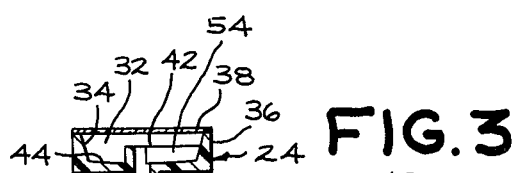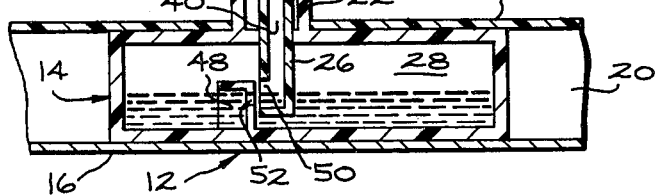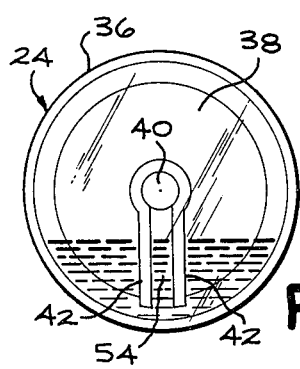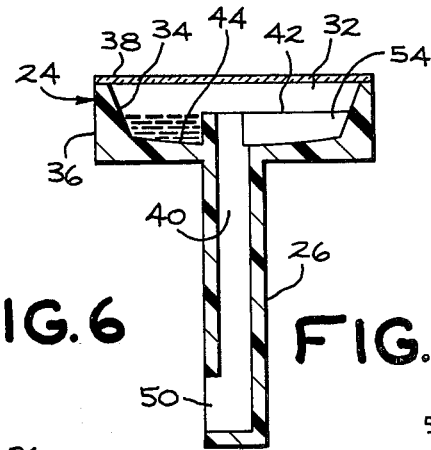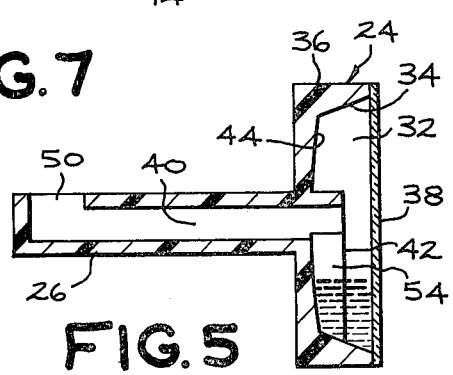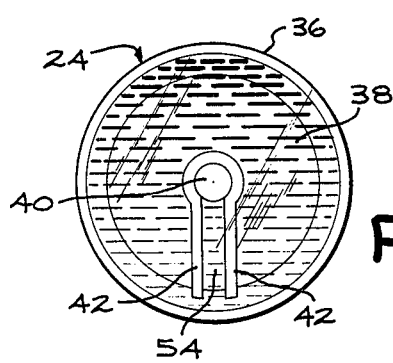

LIQUID LEVEL INDICATING DEVICE

BACKGROUND OF THE INVENTION

1. Field of the Invention

This invention concerns liquid level indicators and more particularly liquid level indicators of the type providing a visual indication of the level of a liquid in a dishwasher door-mounted dispenser tank whenever it is at or above a predetermined level, usually at a level approaching empty.

2. Background of the Invention

It is common practice in the design of modern dishwashing machines to provide liquid dispenser tanks for dispensing automatically rinse aid liquids to prevent the spotting of dishes for the installation of these tanks is within the inner and outer door panels of the dischwasher door since this is convenient space to hold the tank and also provides convenient access for refilling of a tank when the door is in the open position.

A problem inherent in this location is in readily determining the level of liquid within the tank, such that the user may so determine the level without the need to check by dipstick when the level within the tank is approaching empty.

One difficulty arising from the installation within the door involves the inaccessibility of the dispenser, since the tank is confined within the door panels. The inner panel is not available for viewing when the door is in the closed position, while the outer door panel is preferably free from any functional features, as the aesthetic qualities of the front exterior of the machine would be somewhat compromised.

Accordingly, it has been deemed necessary to attempt to determine the level of liquid within the tank when the tank is in the horizontal position with the dishwasher door open. However, in this position, the liquid has retreated from the side adjacent the inner panel and has redistributed itself against the opposite wall which becomes the bottom of the tank, i.e., the sidewall of the tank adjacent the outer door panel. Since this is remote from the inner door panel, a sight glass device is impossible in this situation, requiring that any viewing device to directly view the liquid level in the tank extend into the tank and accordingly be required to depend on ambient light within the tank for viewing of the liquid level.

This latter requirement creates difficulty due to the lack of light in the space between the door panels for easy reading of any viewing device which attempts to view the liquid within the tank, such as is disclosed in U.S. Pat. No. 3,152,723.

This patent discloses the use of an indicator knob which also serves as a filler spout cap having a stem portion extending into the tank and adapted to provide a visual indication when the tank liquid level declines below that at the stem end. Since this approach depends on the light level within the tank to provide the visible indication, it would not afford a highly visible indication.

While any number of elaborate and exotic devices might easily afford a proper indication, an additional constraint applied in the design of such devices intended for incorporation into home appliances is that they be simple and low in cost in keeping with the relatively low selling prices of such appliances.

In application, Ser. No. 852,118, filed Nov. 16, 1977, assigned to the assignee of the present application, there is disclosed a simple low cost device for a dishwasher dispenser tank. In this device, there is provided an arrangement for the capture of a small quantity of the tank liquid if an adequate level of liquid is present in the tank and its retention as the diswasher door is opened. A viewing chamber is provided within an indicator housing extending through the inner door panel, with a sight window allowing observation of the contents of the viewing chamber such that it may be directly viewed from the exterior above the inner door with the ambient room light level affording ready viewing of the quantity of liquid so captured. However, the embodiment disclosed in that application requires redesign of the inner door panel and/or the dispenser tank, and involves an additional opening in the inner door panel.

It is therefore an object of the present invention to provide an indicator device which provides such a direct viewing of a quantity of dispensed liquid within a movable dispenser tank, which quantity of liquid is captured from the liquid within the tank and disposed within a viewing chamber which may be viewed in direct ambient light, but which does not require extensive redesign of the tank or inner panel, and does not necessitate an additional opening in the inner panel.

It is another object of the present invention to provide such a liquid level indicator device which is simple, low in cost and yet provides an effective indication of the liquid level in the dispensing tank whenever the level is at or above a predetermined tank level approaching empty.

SUMMARY OF THE INVENTION

These and other objects of the present invention, which will become apparent upon a reading of the following specification and claims, are accomplished by the use of an indicator knob having a stem portion which serves as the tank closure and which is formed with one or more passages through which is passed a quantity of liquid captured within a feed reservoir mounted within the tank. the quantity of liquid passes into a viewing chamber defined by a recess in the outer face of the indicator knob, with a translucent or transparent sight window covering the viewing chamber such that liquid within the viewing chamber may be viewed directly. The liquid enters the viewing chamber within the impoundment ridge formed in the bottom of the recess so that upon liquid redistributing itself within the viewing chamber by movement of the dishwasher door to the open position, the impoundment ridge causes a portion to be retained and prevented from returning into the tank via the feed passage, while allowing the portion within its area to flow back into the tank.

Upon decline of the liquid level in the tank below the level of the feed reservoir, liquid no longer enters the stem feed passage and, after several door opening and closing cycles, the liquid within the viewing chamber is emptied by flow into the impoundment ridge when the indicator knob is in vertical orientation corresponding to the door being closed to allow escape of liquid through the feed passage. A declining liquid level indication is thus provided which is designed to correspond to the approach of an empty dispensing tank.

BRIEF DESCRIPTION OF THE DRAWINGS

FIG. 1 is a front elevational view of a dishwasher showing the installation location of the dispenser tank in the front door.

FIG. 2 is a view of the section A—A taken in FIG. 1 through the dispenser tank, the view being enlarged to show the details.

FIG. 3 is a sectional view of the fill tank and indicator knob devices in te horizontal position assumed upon opening of the dishwasher door.

FIG. 4 shows a sectional view of the dispenser tank and indicator knob of FIG. 3 in the vertical position depicting the liquid flow into the viewing chamber.

FIG. 5 is an enlarged sectional view of the indicator knob depicting the distribution of liquid in the position shown in FIG. 4.

FIG. 6 is a frontal view of the indicator knob showing the liquid as distributed in FIG. 5.

FIG. 7 is an enlarged sectional view of the indicator knob repositioned in the horizontal position with the resultant redistribution of liquid.

FIG. 8 is a top view of the indicator knob in the position shown in FIG. 7.

DETAILED DESCRIPTION OF THE PREFERRED EMBODIMENT

Figure 9:
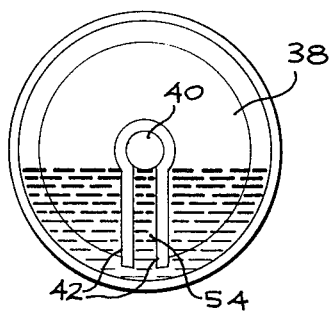
FIGS. 9 through 11 are front views of the indicator knob with successive declines in the liquid level within the viewing chamber occurring with successive door opening and closing cycles of the door.

In the following detailed description, certain specific terminology will be utilized for the sake of clarity and a specific embodiment described in accordance with the requirements of 35 USC 112, but it is to be understood that the invention is not intended to be limiting and should not be so construed inasmuch as the invention is capable of taking many forms and variations within the scope of the appended claims.

Referring to the drawings, and particularly FIG. 1, the dishwasher 10 is of the front opening type in which a door 12 is adapted to be swung from the vertical, closed position to the horizontal, open position to provide access to the interior cabinet space for the loading of items to be washed. Within the dishwasher door 12 is mounted the liquid dispenser tank 14 for automatic dispensing of a predetermined relative small quantity of liquid at an appropriate point during the rinse cycle.

As seen in FIG. 2, the dishwasher door 12 is constructed of an outer steel panel 16 and an inner panel 18 typically of formed plastic. The space therebetween 20 affords an advantageous location for mounting of the dispenser tank 14. A suitable automatic dispensing device (not shown) associated with the dispenser tank 14 is typically provided for the purpose of dispensing the liquid into the rinse water.

The dispenser tank 14 includes a fill spout 22 protruding through the inner door panel 18 and having a fill opening 30 formed therein to provide means for adding the dispensed liquid to the dispenser tank 14.

According to the present invention, the fill opening closure is provided by an indicator device housing here provided by an indicator knob 24 having a stem portion 26 extending into the interior space 28 of the dispenser tank 14, providing a friction fit removable closure for the fill opening 30.

The indicator knob 24 includes an externally visible viewing chamber 32 defined by a recess 34 formed within the outer face portion 36 of the indicator knob 24. The outer portion of the viewing chamber 32 is covered by sight window 38 formed of a translucent or transparent material such as to allow ready observation of the interior of the viewing chamber 32.

The stem portion 26 is formed with one or more feed passages 40 for allowing liquid fluid flow through the interior of the stem 26 into fluid communication with the viewing chamber 32, passing into the area within an impoundment ridge 42. As best seen in FIG. 6, the ridge 42 extends partially above the bottom surface 44 of the recess 34 and intersects the recess sidewall to define an impoundment for retaining a portion of the liquid within the viewing chamber 32 after the indicator knob 24 is oriented with the stem 40 in the vertical position, upon opening of the dishwasher door as shown in FIG. 3.

The movement of the liquid from the interior 28 of the dispenser tank 14 to the viewing chamber 32 is initiated in the dooropen position shown in FIG. 3. The tankside forming the bottom surface when the dispenser tank 14 is in the horizontal position shown in FIG. 3 has mounted adjacent to it a feed reservoir 46 having a chamber 48 positioned in alignment with the stem 26 of the indicator knob 34 and positioned above an opening 50 formed in the end of the stem 26. The feed reservoir 46 is formed with an opening 52 in alignment with the opening 50 in the indicator knob 24. When the door 12 is opened and the dispenser tank 14 is in the horizontal position, liquid thus occupies the chamber 48 of the feed reservoir 46, as shown.

Upon movement of the door 10 to the closed position, the liquid is captured within the feed reservoir chamber 48 and is directed toward the opening 52 into the opening 50 thence to flow by gravity through the passageway 40 into the viewing chamber 32, since at least a portion of which is located vertically below the feed passage 40. The liquid thus flows over the impoundment ridge 42 and between a clearance space 54 between the impoundment ridge 42 and the sight window 38 as seen in the enlarged view in FIGS. 5 and 6.

Upon opening of the dishwasher door 12 and its being swung down so as to bring the stem 26 into the vertical position, the small quantity of liquid disposed between the impoundment ridge 42 passes back into the interior of the tank by flowing through the feed passage 40 but the majority of liquid is retained within the recess 32 by virtue of the impoundment ridge 42 preventing the liquid from passing into and out of the feed passage 40. This quantity of liquid, occupying the space remaining outside the impoundment ridge 42 may thus be viewed through the sight window 38.

Rinse aid liquids are generally blue in color so as to provide a relatively vivid visual indication when the liquid is present in the viewing chamber 32. As long as the depth of the liquid within the interior 28 of the dispenser tank 14 is sufficient such that a significant quantity of liquid is captured within the feed reservoir 48, upon each opening and closing of the door 12, the liquid is replenished in a similar manner such that a full indication is provided by the presence of the liquid completely covering the bottom surface of the viewing chamber 32 outside the impoundment ridge 42.

Figure 10:
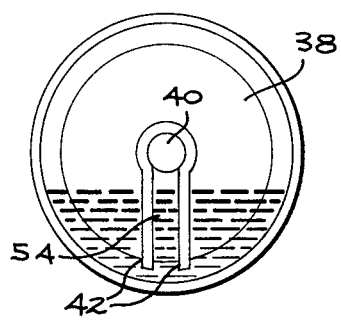
Figure 11:
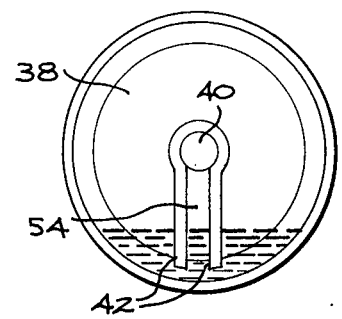

Upon decline of the liquid level in the dispenser tank below the predetermined minimum which would be selected to be approaching an empty dispenser tank 14, no liquid would be reintroduced by an opening and closing of the door 12. As seen in FIGS. 9 through 11, successive openings and closings of the door would then cause a loss of a portion of the liquid in the viewing chamber by virtue of the capture within the impoundment ridge 42, of a certain proportion of the total quantity of the liquid. Thus, after the predetermined level is reached, there is a successive emptying of the viewing chamber and successively incremented emptying of the chamber to correspond to the depletion of the remaining liquid within the dispenser tank 14 until the point is reached at which no appreciable amount of liquid remains in the dispenser tank 14. The user is apprised of this fact by observing the lack of liquid in the viewing chamber 32.

It is noted that in order to function in this manner, the impoundment ridge 42 must be located so that the area within the ridge 42 extends to the lowermost portion of the viewing chamber 32 when the dispenser tank 12 is in the door closed position, and that the dispenser tank 12 be below the viewing chamber 32 when in the door open position so that flow out of the viewing chamber 32 always occurs (if liquid is present) upon the opening of the door 14. If outflow did not occur, liquid once entering the viewing chamber 32 would never be removed, even after cessation of inflow.

This concept thus involves operating principles consisting of inflow during the door closing, and limited outflow during door opening to leave sufficient liquid for an indication function. Upon cessation of inflow, the limited outflow serves to empty the viewing chamber 32.

The rapidity with which the emptying of the viewing chamber 32 occurs depends of course on the relative recess areas within and without the impoundment ridge perimeter 42, to allow matching of cycling to depletion of the dispensed liquid.

This feature of the indicator mode of the present invention may be utilized to full advantage with masking panels used in conjunction with the viewing window 38 and also with the indicator characters formed on the bottom portion of the recess 34. Alternate variations of this refinement are shown in FIGS. 12 through 17.

Figure 12:
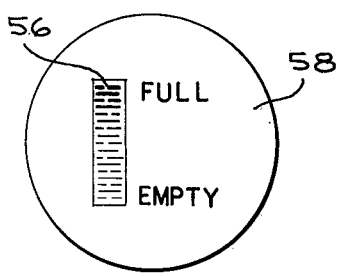
FIGS. 12 and 13 are frontal top views of a sight window masking panel respectively depicting a full-empty indication.
Figure 13:
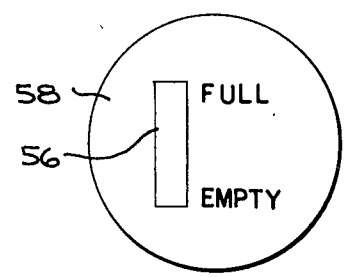

In FIGS. 12 and 13, a slot 56 is formed in a masking panel 58. The slot 56 allows sighting into the viewing chamber 34, the mask 58 being opaque. The full/empty character indications are provided such that as the liquid level declines, a sight glass type visual indication is provided.

Figure 14:
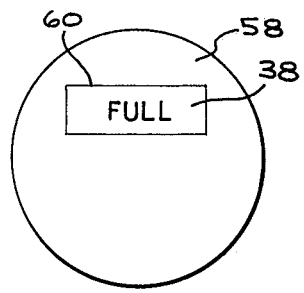
FIGS. 14 and 15 are frontal top views of an alternate variation of the masking panel, shown in full/empty conditions, respectively.
Figure 15:
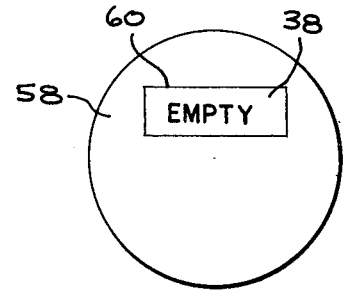

In FIGS. 14 and 15, the mask 58 is provided with a horizontal slot opening 60 with the transparent panel 38 beneath the slotted opening of the panel 58 being formed with indicia indicating the full position when the surface is wet by the liquid. In FIG. 15, when the liquid level declines to empty, opposite the slotted opening 56, indicia on the bottom of viewing chamber 32 is provided which then becomes visible to provide an empty indication.

Figure 16:
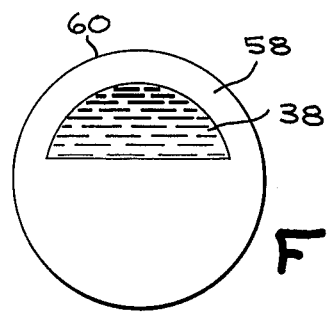
FIGS. 16 and 17 are frontal top views of another variation of the masking panel used in conjunction with the sight panel to provide an empty indication only.
Figure 17:
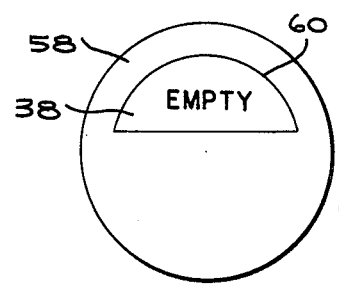

A simplified version of this is shown in FIGS. 16 and 17 in which the hemispherical cutout is provided in the masking panel 58 which obscures the bottom lettering which indicates the empty condition upon the level falling below the level of the cutout.

Figure 18:
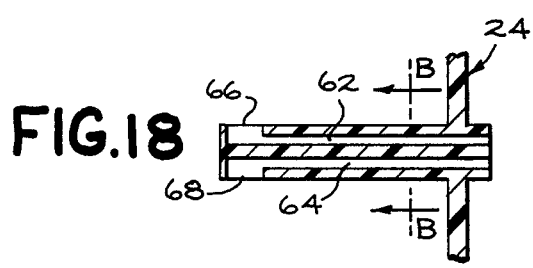
FIG. 18 is a fragmentary sectional view of an alternate form of the indicator knob feed passage.
Figure 19:
FIG. 19 is a view of the section B—B taken in FIG. 18.

From the above description, it can be appreciated that the passage 40 in the stem and opening 50 in the stem terminus must be properly aligned with the feed reservoir 46 and the opening 52. This means the closure must be inserted in the correct angular position in the spout opening 30. This can be easily done by means of mating grooves, etc. in the stem 26 of the indicator knob 24. An alternate approach would be to provide additional feed passages which are 180° opposite each other with corresponding stem end openings, as shown in FIGS. 18 and 19.

In this version, a pair of stem openings 62 and 64 extend into corresponding end openings 66 and 68, respectively, such that the indicator knob 24 may be positioned in either up or down position.

By adding the additional passage, a vent passage for venting of the escape air is also provided. In the above described embodiment the centrally located feed passage 40 is of sufficient size to allow vented flow back through the central feed passage 40, while accommodating liquid flow into the viewing chamber 32.

Additional passages could be provided at equally spaced locations so as to allow the indicator knob 24 to be inserted at any angle or position within the filler spout opening 30.

Accordingly, it can be seen that this approach allows the viewing of any liquid in the viewing chamber 32 under room ambient light conditions under which a relatively high light level is aviable for viewing the liquid level, to accordingly provide a vivid visual indication.

The liquid is captured and caused to flow to the viewing chamber and a portion held there as the dishwasher door is opened and closed.

This has been accomplished by using an extremely simple indicator device having no moving parts by virtue of non-valved gravity flow. The level of light in which the viewing takes place, allows the use of relatively low cost plastic materials instead of relatively exotic materials which must be utilized in those applications depending on the interior light level within the tank.

While this invention has particular application to dishwasher door-mounted dispenser tanks, from the above description, it can be seen that the arrangement according to the present invention broadly provides an arrangement for indicating the level of liquid in any movably mounted tank in which the tank is movable between a first position (door open) to a second position (door closed). This arrangement broadly provides a feed means for causing liquid gravity flow out of the tank into an externally visible viewing chamber formed in an indicator housing when the tank is in the second position, and when there is a sufficient level of liquid in the tank, but includes means retaining a portion of that liquid in the viewing chamber against gravity flow back into the tank as the tank moves into the first position whereat the visual indication is desired and thus provided. The feed means comprises the feed reservoir 46 capturing a quantity of the liquid as it redistributes itself when the tank moves into the second position, with a gravity flow out of the reservoir into the opening 50 positioned below the opening 52 and thence through the feed passage 40 into the viewing chamber 32.

The means retaining the fluid commprises the impoundment ridge 42 which in the first position prevents backflow out of the feed passage 40 of most of the liquid passed into the viewing chamber 32, to thereby enable a visual indication when the tank is in the first position of the level in the tank.

The indicator knob 24 further includes a stem portion 26 acting as the closure such that no modifications to the tank or mounting structure are required in order to adapt the indicator to existing tank designs.

It is to be noted that while the description above is in terms of providing a visual indication when the liquid level is "at or above" a predetermined level, there is also inherently provided an indication when the level is below the predetermined level, since the absence of that visual indication of course functions as an indicator as well.

It should be apparent to those skilled in the art that the embodiments described heretofore are considered to be the presently preferred forms of this invention. In accordance with the Patent Statutes, changes may be made in the disclosed mechanism in the manner in which it is used without actually departing from the true spirit and scope of this invention.

What is claimed is:

1. In combination with a dishwashing machine of the type having a door movable between an open and closed position;
    a liquid dispenser tank mounted to said door, the dispenser tank including an opening formed in a filler spout extending through the inside of said door allowing refilling of said dispenser tank with liquid dispensed therefrom;
    a liquid level indicator device providing a visual indication of the level of liquid in said dispenser tank whenever said level is at or above a predetermined level;
    said indicator device comprising an indicator knob having a stem portion extending vertically into said dispenser tank with said door in said open position and disposed in said tank with said door in said open position and disposed in said fill opening providing a closure for said dispenser tank fill opening;
    a viewing chamber formed by a recess within said indicator knob;
    a sight window covering said viewing chamber in said indicator knob;
    feed means for causing a predetermined quantity of liquid to flow from said dispenser tank into said viewing chamber upon closing of said door only when the level of liquid in said dispenser tank is at or above said predetermined level;
    and means retaining a portion of said liquid in said viewing chamber upon opening of said door, whereby the presence of the liquid in said viewing chamber provides a visual indication that the level of said liquid in said tank is above said predetermined level, wherein said feed means includes at least one feed passage extending within said stem portion and further includes an opening at an end portion of said stem in communication with said feed passage, whereinn said feed means further comprises a feed reservoir located in said dispenser tank to capture a quantity of liquid as said dispenser tank is repositioned and the liquid redistributes itself upon opening of said door, whenever said liquid level in said tank is above said predetermined level and further including means causing flow of said captured quantity of liquid into said opening in said end of said stem portion.

2. The dishwasher according to claim 1 wherein said feed means for causing flow of said captured quantity of liquid into said viewing chamber further includes an opening formed in said feed reservoir in alignment with said opening in said end of said stem portion and wherein said feed reservoir opening is above said opening in said stem when said door moves to the closed position whereby said liquid flows by gravity into said opening through said feed passage in said stem portion into said viewing chamber.

3. The dishwasher according to claim 1 wherein said viewing chamber comprises a recess formed in said indicator knob further including an impoundment ridge extending above the bottom of said recess and defining an impoundment area in conjunction with the sidewall of said recess in said indicator knob, and wherein said feed means includes a feed passage receiving said quantity of liquid, said feed passage opening into said impoundment area and wherein said impoundment ridge partially extends above said recess bottom to create a clearance between said sight window and said impoundment ridge, whereby liquid flows into said feed passage and into said impoundment area when said door moves into the closed position and liquid thereby flows between and into said clearance space, and upon movement of said door to the open position, a predetermined quantity of liquid is retained in the outside of the impoundment area in said viewing chamber.

4. The dishwasher according to claim 3 wherein said feed means includes at least one feed passage extending within said stem portion and further includes an opening at the end portion of said stem in communication with said feed passage.

5. The dishwasher according to claim 4 wherein said feed means further comprises a feed reservoir formed in said dispenser tank, said feed reservoir located in said dispenser tank to capture a quantity of liquid as said dispenser tank is repositioned and the liquid redistributes itself upon opening of said door, whenever said liquid level in said tank is above said predetermined level and further including means for causing flow of said captured quantity of liquid into said opening in said end of said stem portion.

6. The dishwasher according to claim 5 wherein said feed means for causing flow of said captured quantity of liquid into said viewing chamber further includes an opening formed in said feed reservoir in alignment with said opening in said end of said stem portion wherein said feed reservoir opening is above sand opening in said stem when said door moves to the closed position whereby said liquid flows by gravity into said opening through said feed passagge in said stem portion into said viewing chamber.

7. The dishwasher according to claim 6, wherein said sight window is covered by an opaque masking panel having a cutout opening allowing visibility of the quantity of liquid in said viewing chamber when said quantity is above a predetermined quantity.

8. The indicator device according to claim 3 wherein said impoundment ridge comprises a pair of closely spaced ridge contours extending from a siddewall of said recess into a central portion of said recess and wherein said flow passage extends into said recess through said central portion intermediate said impoundment ridge contours, whereby the quantity of liquid returned through said flow passage upon movement of said dishwasher door to the horizontal position is limited to that between said closely spaced impoundment ridges.

9. A liquid level indicating device providing an indication of the level of liquid within a tank, said tank being mounted so as to be movable between a first position and a second position, said liquid level indicating device comprising;

a viewing chamber including a sight window allowing observation of the interior of said viewing chamber;

feed means for causing a quantity of liquid to flow out of the tank into said viewing chamber upon movement of said tank from said first to said second position only when said liquid level in said tank is at or above said predetermined level, said means including means capturing a quantity of liquid as said liquid redistributes itself in said tank upon movement of said tank from said first position to said second position;

means retaining a portion of said liquid flowing into said viewing chamber upon movement of said tank from said second position to said first position, while allowing a portion of the captured quantity of liquid in said viewing chamber to be passed back into the interior of said tank whereby said liquid in said viewing chamber provides a visual indication that the liquid level in said tank is above said predetermined level, wherein said capturing means includes a feed reservoir mounted within said tank capturing said quantity of liquid upon said movement of said tank from said first to said second position and wherein said indicating device includes an indicator knob within which is formed a recess comprising said viewing chamber, said indicator knob including a stem portion extending into said tank to a point adjacent said feed reservoir, said feed means further including a feed passage formed in said stem portion extending into said viewing chamber, and also including means causing the liquid captured in said feed reservoir to flow into said feed passage upon movement of said tank from said first to said second position.

10. The indicator device according to claim 9 wherein said means causing said flow into said flow passage comprises an opening in said feed reservoir located above and aligned with an opening in said stem communicating with said feed passage when said tank is in said second position, whereby gravity causes said liquid to flow into said feed passage.

11. The indicator device according to claim 10 wherein said means retaining said liquid in said viewing chamber comprises an impoundment ridge formed about the bottom of said viewing chamber when said tank is in said first position and defining an impoundmennt for liquid in said viewing when said tank is in said first position.

12. The indicator device according to claim 11 wherein said tank is disposed below said viewing chamber when said tank is in said second position and wherein the area within said impoundment ridge extends to the lowermost portion of said viewing chamber when said tank is in said second position, whereby flow back out of said viewing chamber of at least a portion of said liquid in said viewing chamber always occurs upon movement of said tank from said second position to said first position.

13. The indicator device according to claim 12 wherein said impoundment ridge extends only partially above the surface of said viewing chamber when said tank is in said first position whereby said liquid passes over said impoundment ridge when said tank is in said second position to retain said portion upon movement of said tank to said first position.

14. The indicator device according to claim 9 wherein said stem portion is removably secured in an opening in said tank to thereby act as a removable closure for said opening.

* * * * *

UNITED STATES PATENT AND TRADEMARK OFFICE
CERTIFICATE OF CORRECTION

PATENT NO. : 4,164,197
DATED : August 14, 1979
INVENTOR(S) : Thomas E. Nelson

It is certified that error appears in the above-identified patent and that said Letters Patent are hereby corrected as shown below:

Column 7, Lines 45 and 46, Claim 1, words have been duplicated. Please delete [tank with said door in said open position and disposed in said].

Column 7, Line 66, Claim 1, the word "whereinn" should read "wherein".

Column 8, Line 55, Claim 6, the word "sand" should read "said".

Column 8, Line 58, Claim 6, the word "passagge" should read "passage".

Column 8, Line 67, Claim 8, the word "siddewall" should read "sidewall".

Column 10, Line 18, Claim 11, the suffix "mennt" should read "ment".

Signed and Sealed this

Twentieth Day of November 1979

[SEAL]

Attest:

RUTH C. MASON
Attesting Officer

LUTRELLE F. PARKER
Acting Commissioner of Patents and Trademarks